Dec. 26, 1939.  C. HUENLICH  2,184,366

PHONOGRAPH RECORD SHAVING MACHINE

Filed July 1, 1938  3 Sheets-Sheet 1

INVENTOR
Charles Huenlich
BY Henry Lanahan
ATTORNEY

Dec. 26, 1939.　　　　C. HUENLICH　　　　2,184,366
PHONOGRAPH RECORD SHAVING MACHINE
Filed July 1, 1938　　　　3 Sheets-Sheet 2
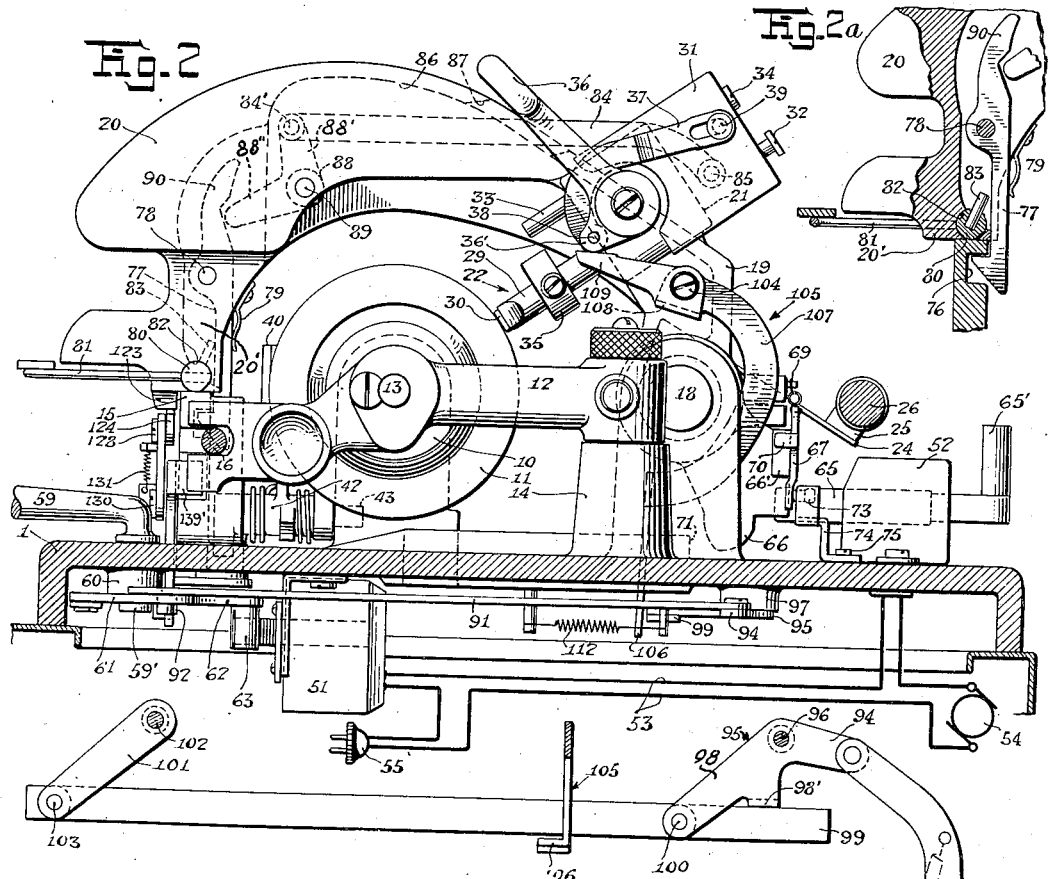
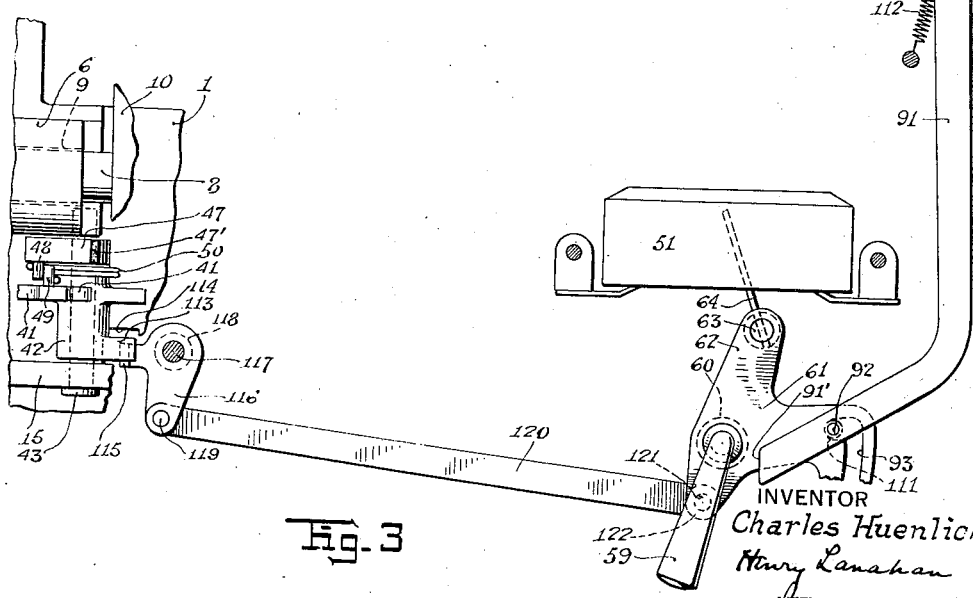
INVENTOR
Charles Huenlich
Henry Lanahan
ATTORNEY

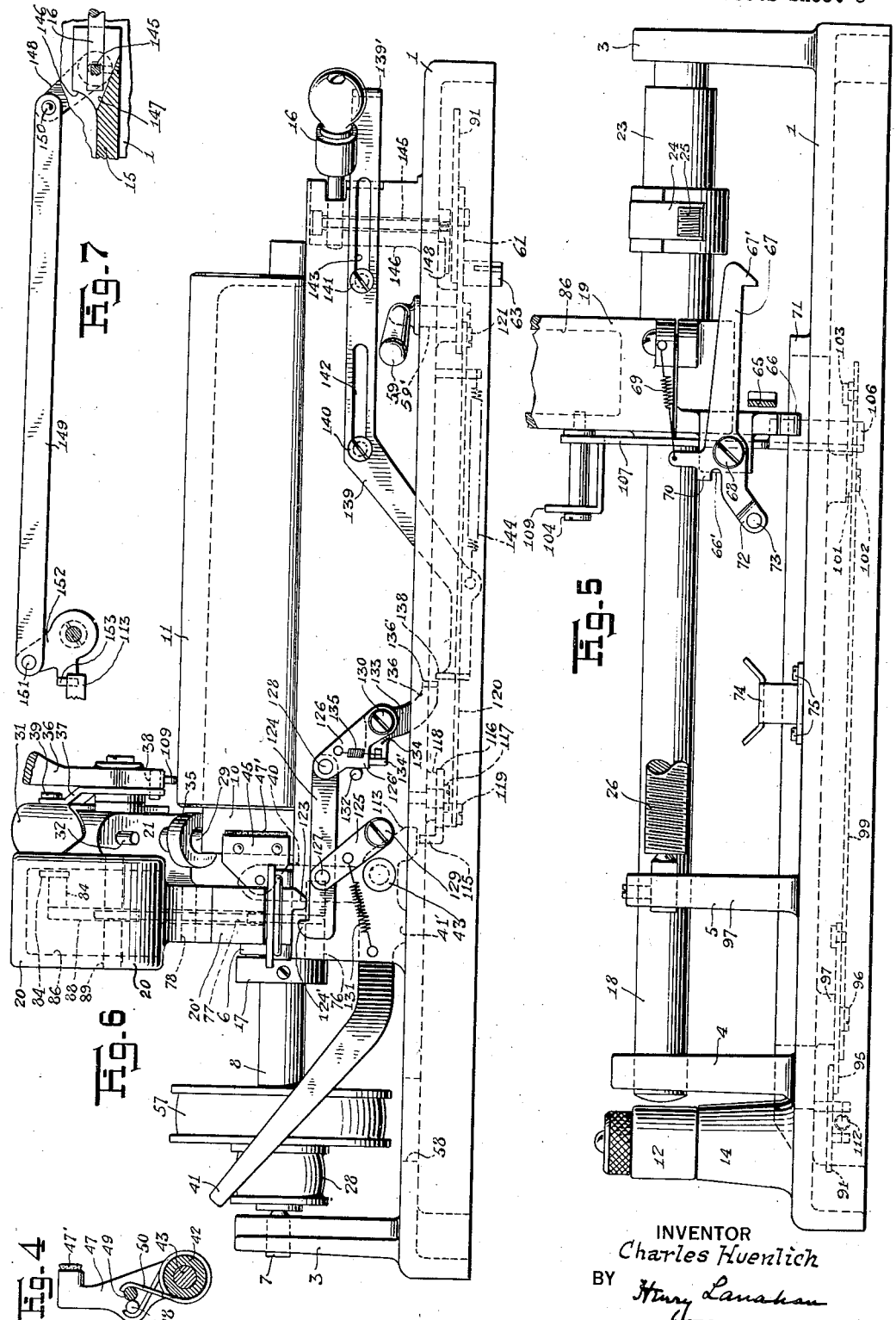

Patented Dec. 26, 1939

2,184,366

UNITED STATES PATENT OFFICE 2,184,366

PHONOGRAPH RECORD SHAVING MACHINE

Charles Huenlich, Bloomfield, N. J., assignor to Thomas A. Edison, Incorporated, West Orange, N. J., a corporation of New Jersey Application July 1, 1938, Serial No. 216,886

33 Claims. (Cl. 82—1.1)

This invention relates to machines for shaving or resurfacing phonograph records principally of the type intended for use with dictating machines. It is especially concerned with improvements in shaving machines adapted to facilitate their operation and to prevent the operator from inadvertently performing operations in the use of the machine which may result in damage to the machines or to the records to be resurfaced.

A record shaving machine typically comprises means for rotating a record, and a carriage having a resurfacing tool mounted thereon for movement into operative and inoperative positions with respect to the record. The carriage may be fed, as from an initial position to a terminal position across the record, for effecting a traversal of the tool with respect to the record. When the tool is moved into operative position and the carriage feeding means and record rotating means are put into operation as by suitable means provided for controlling the operation of the machine, a tool-record traversal will be effected so as to cause a surface layer of the record to be cut away. In order that the carriage may be manually returned to initial position, as for another tool-record traversal, it is arranged so that it may be disengaged from the feeding means provided therefor; such disengagement is usually effected by a raising of the carriage arm from its normal operative position so that the resurfacing tool will also be rendered suitably free of the record. In order that there may be taken a second or finishing cut after a first or heavy cut has been taken, there is also provided a suitable finishing-cut controlling means for advancing the tool a predetermined distance toward the record. In taking the finishing cut the carriage will be returned to initial position and the resurfacing tool will be moved into a finishing-cut position; whereas in taking another heavy cut the carriage will be returned and the resurfacing tool will be reset into a new operative position. When the record is suitably resurfaced it will then be ejected from the machine, as by a suitable record-ejecting means provided for this purpose. Thus it will be understood that the operation of resurfacing a record requires that a series of manipulations be performed in suitable sequence; departures from this sequence may occasion damage to the machine or to the records to be resurfaced.

It is an object of my invention to provide a generally improved form of phonograph record shaving machine in which the number of manipulations required in the operation of shaving a record are materially reduced.

It is another object of my invention to provide, in phonograph record shaving machines, improved means by which essential operative manipulations in the use of the machine may be performed only in proper sequence.

It is another object of my invention to provide means by which the carriage may be returned from its terminal position only when the machine is properly conditioned to safely permit such return movement of the carriage for a reshaving operation or for a finishing cut after the first or rough cut has been taken.

It is another object of my invention to automatically stop the shaving machine after the resurfacing tool has traversed the record and to prevent the return of the carriage from its terminal position until the resurfacing tool is moved to an inoperative or to a finishing-cut position.

It is another object of my invention to automatically stop the machine at the end of a tool-record traversal and to automatically re-start the machine as the carriage is returned to initial position for a finishing-cut operation.

It is another object of my invention to render the carriage free for return movement and to release the resurfacing tool from operative position as an incident of conditioning the machine so that it will remain stopped as the carriage is returned to initial position.

It is a further object of my invention to positively prevent the operation of the record ejecting means while the machine is in operation or in a condition capable of being restarted.

It is another object of my invention to automatically move the resurfacing tool as an incident of mounting a record on the machine so that the tool will overlie the record when the mounting operation is completed.

It is another object of my invention to provide, in phonograph record shaving machines, simultaneously operated means for stopping the machine, releasing the resurfacing tool from set position, and rendering a record-ejector locking means and a carriage locking means respectively inoperative.

Other and allied objects will more fully appear from the following description and the appended claims.

In the description of my invention reference is had to the accompanying drawings, of which:

Fig. 2 is a vertical cross-sectional view taken along the line 2—2 of Fig. 1;

Fig. 2a is a right hand view of a forward portion of the carriage, showing the carriage locking means and the cooperating finishing-cut or tool advancing means;

Fig. 3 is a top plan view of the record ejector and mandrel brake of Fig. 1 together with a small portion of the machine, other portions of the machine being broken away to show the operative connection between a manual control switch for the machine, a record-ejector locking means, and a resurfacing tool release means;

Fig. 4 is a vertical cross-sectional view taken along the line 4—4 of Fig. 1, showing the operative connection between the record ejector and the mandrel brake;

Fig. 5 is a rear elevational view of a portion of the machine of Fig. 1 showing the means for operatively connecting the carriage with an automatic control switch;

Fig. 6 is a front elevational view of a portion of the machine of Fig. 1, showing the means for partially returning the carriage from its terminal position as the end-gate for holding the mandrel shaft is closed; and Fig. 7 is a detail view of a modification of my invention showing means for controlling the record-ejector locking means by the operation of the latch for the end gate.

Figure 1:
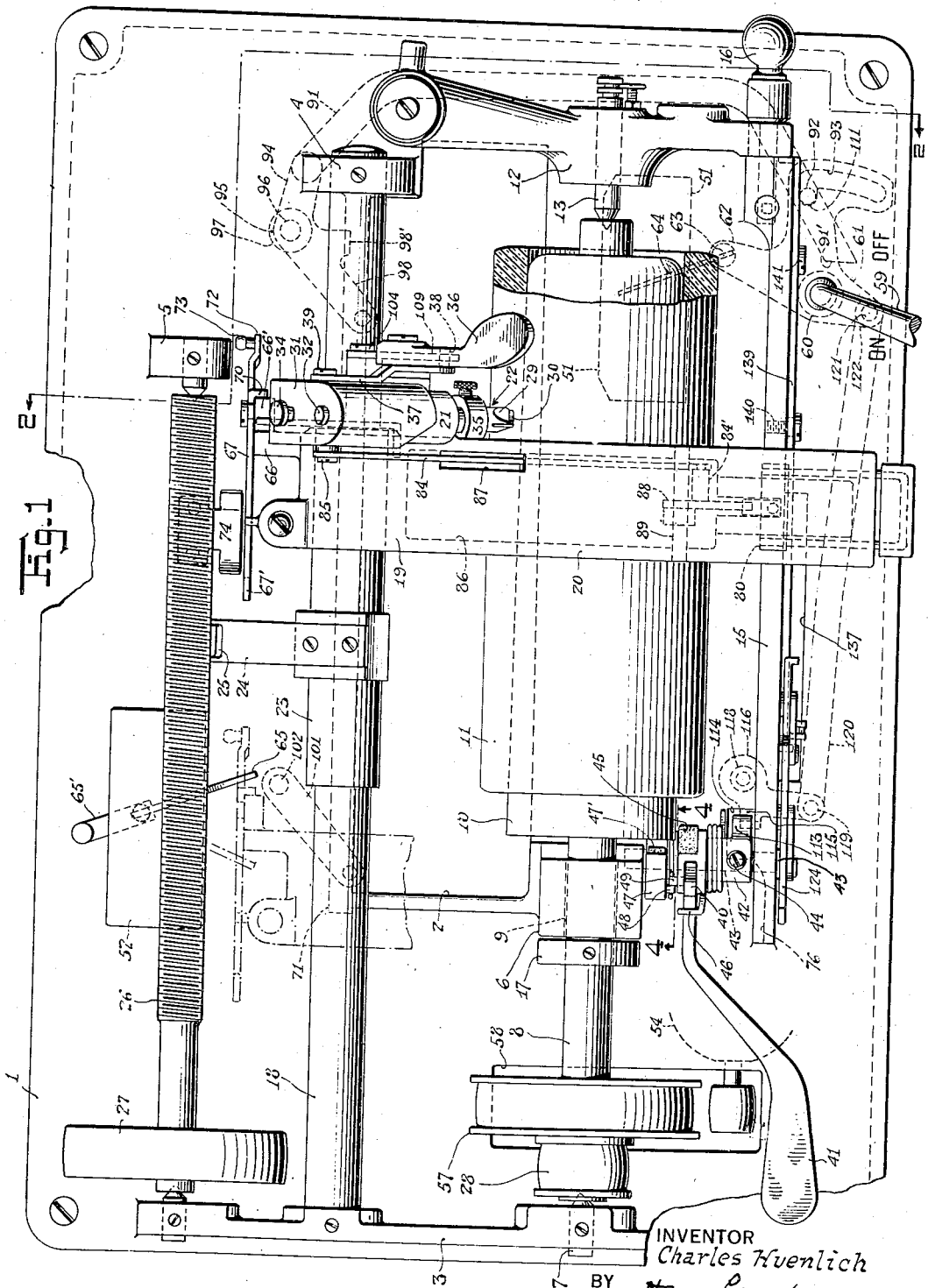
Figure 1 is a top plan view of a phonograph record shaving machine showing my invention as applied thereto.

Reference being had to Fig. 1 there will be seen a form of phonograph record shaving machine in which my invention is preferably employed. This machine comprises a base plate 1 having a left-hand standard 3, right-hand standards 4 and 5, and an intermediate standard 6. In the standard 3 there is provided a conically pointed stud 7 which engages a recess in the left end of a shaft 8, thereby providing a thrust bearing for the shaft. The shaft 8 passes through an oversized hole 9 (see also Fig. 3) in the intermediate standard 6 and is provided with a mandrel 10 for holding a suitable record 11 to be resurfaced. The right end of the shaft 8 is supported by an end-gate 12 carrying an adjustable conical stud 13 adapted to engage a recess in the right end of the shaft 8 and be biased thereagainst.

The end-gate 12 is pivoted to a boss 14 on the base plate 1 so that it may be opened or swung outwardly from a supporting position to a nonsupporting position wherein it is free of the right end of the mandrel 10, thereby permitting a record to be mounted on or to be removed from the mandrel. The end-gate 12 may be closed or moved into its supporting position by imparting a clockwise movement thereto until its forward extremity impinges against the right end of a guide rail 15, in which position it may be releasably held by a suitable latch 16. When the end-gate 12 is open the shaft 8 is intermediately supported by the intermediate standard 6, in which case the shaft 8 will tend to move rightwardly free of the stud 7 at its left end, but such movement is restricted by the impingement of a collar 17, secured to the shaft, with the left side of the standard 6.

When the end-gate 12 is in its supporting position the mandrel 10 is rotatably supported in an operative position in which the mandrel is in true parallel relation with respect to the guide rail 15. Supported by the left and right standards 3 and 4 is a longitudinal rod 18 which is also in true parallel relation with the guide rail 15 and on which there is slidably and tiltably mounted a carriage 19, the carriage being provided with a sleeve bearing 23 embracing the rod 18. This carriage is also provided with an approximately semi-circular and forwardly extending arm portion 20 having a downwardly extending shoe portion 20' disposed directly above and supported by the guide rail 15. On the carriage arm 20 there is a ball-shaped weight or hand piece integrally formed with the arm portion 20 and located substantially above the guide rail 15, as shown in Fig. 2.

On the right-hand side of the carriage 19 there is a boss 21 which substantially overlies the longitudinal rod 18. The boss 21 supports a resurfacing tool 22 which is mounted for movement into operative position with respect to the record; when the resurfacing tool is in such position it will cut away a surface layer of the record material as the record is rotated and the carriage 19 is steadily moved transversely of the direction of record rotation. (This cut away layer may pass through an opening 2 in the base plate 1 so as to be collected by a suitable container beneath the plate.) In order that such transverse movement, or longitudinal movement with respect to the record 11, may be imparted to the carriage 19 by the rotation of the mandrel 10, the carriage is provided with a rearwardly extending and resilient arm 24 mounted on the sleeve bearing 23 and carrying a feed nut 25. When the carriage arm 20 is in its normal lowered or operative position, the shoe 20' being supported by the guide rail 15, the feed nut 25 engages the underside of a feed screw 26 rotatably held in the left and right standards 3 and 5 and provided with a pulley 27 which is adapted to be coupled, as by a suitable belt, to a pulley 28 located on the shaft 8. A rotation of the mandrel 10 will then provide rotational movement of the feed screw 26 to effect a longitudinal movement (in a lefthand direction) of the carriage 19 with respect to the mandrel. It will be understood that with this arrangement an upward tilting movement of the arm 20 will cause the resurfacing tool 22 to be moved away from the record 11, and the feed nut 25 to be moved downwardly out of engagement with the feed screw 26, thereby permitting the carriage to be manually moved, at will, along the record 11. Such upward tilting movement of the carriage arm is, however, adapted to be limited by the impingement of a rearwardly and downwardly extending arm 66 on the carriage with a stop 71 suitably comprising a reenforcing rib extending along the rear edge of the opening 2.

The resurfacing tool 22 comprises a knife bar 29 carrying a knife blade 30 at its inner or lower end. The knife bar 29, which is slidably mounted in an opening provided in the boss 21, is movable towards and away from the record 11 so as to move the resurfacing tool 22, or the knife blade 30 which forms a part thereof, into and out of operative position with respect to the record 11. Although my invention is not limited as to the form of knife setting mechanism to be used, I preferably employ a form such as is disclosed in Brown Patent No. 2,137,383, issued November 22, 1938, and entitled "Record shaving machine". This mechanism may be briefly described as follows:

The outer or upper end portion of the knife bar 29 extends loosely through the top wall of a hollow cap 31 which fits slidably over the boss 21. Upward or rearward movement of the cap 31, with respect to the knife bar 29, is limited by a head 32 provided on the upper extremity of the knife bar. The cap 31 is resiliently coupled to the knife bar 29 so that, as the cap 31 is moved downwardly or towards the record 11, the knife bar 29 is yieldingly moved downwardly to bring the knife blade 30 into engagement with the record. The cap 31 is guided by means of a guide rod 33 secured to the cap 31 by means of a headed screw 34 and slidably held in an opening which extends through the boss 21 in parallel relation to the opening through which passes the knife bar 29. In order that the resurfacing tool 22 will be normally maintained in an upward or inoperative position, the cap 31 is suitably biased upwardly. Such upward or inoperative position of the resurfacing tool 22 is determined by the abutment of a collar 35, which is secured to the lower or inner end portion of the knife bar 29 by a set screw 35', with the underside of the boss 21.

The setting of the resurfacing tool 22 is effected by means of an actuating lever 36 which is pivotally mounted on the right side of the boss 21. A downward swinging movement of the lever 36 is adapted to move the cap 31 downwardly for yieldingly moving the resurfacing tool into operative engagement with the record 11. The lever 36 is provided with a short arm extension 36' which is coupled by means of a link member 37 to the cap 31, the link member being connected to the arm extension 36' by the pivot screw 38, and to the cap member 31 by the pivot screw 39. The lower portion of the link member 37 has a gooseneck form or shape so that it will remain clear of the hub of the lever 36 as the lever is swung downwardly in the setting of the resurfacing tool; the gooseneck portion however is adapted to engage the hub of the lever 36 to limit the downward movement of the lever to a position in which the axis of the pivot screw 38 is slightly past dead center with respect to the pivot axis of the lever 36 and the pivot screw 39. It will therefore be apparent that the lever 36 is releasably locked whenever it is in its terminal or downmost position by reason of the upward biasing force exerted upon the cap 31. It is further apparent that a slight upward or "tripping" movement imparted to the lever 36 to return the pivot screw 38 across the dead center line aforementioned will effect the release of the resurfacing tool from set position, by reason of the upward biasing force exerted upon the cap 31.

For facilitating the removal of a record from the mandrel 10 there is provided a record ejector comprising a record-ejecting arm 40 and an operating arm 41 having a common hub 42 which is mounted on a shaft 43 and firmly secured thereto by means of a set screw 44, the shaft 43 being rotatably supported between the guide rail 15 and the standard 6. The record-ejecting arm extends substantially vertically upwardly when the record ejector is in an inoperative position as shown in Fig. 6, and carries a record engaging shoe 45 pivotally connected thereto and positioned slightly to the left of the adjacent end of the record 11 mounted on the mandrel 10. The inoperative position of the record ejector is determined by the abutment of a projection 41' provided on the arm 41 (see Figure 6) with the base plate 1. The record ejector is normally maintained in such position by means of a coil spring 46 adapted to urge the arm 41 in a counter-clockwise direction. In operating the record ejector the operating arm 41 is swung in a clockwise direction so as to bring the record engaging shoe 45 into contact with the record for pushing the record off the mandrel 10, the mandrel 10 being slightly tapered so that the record 11 may closely fit the mandrel and be yieldably held thereon by the friction between the record and the mandrel.

Whenever a record is to be removed from the mandrel 10 it is important that the mandrel have first stopped rotating. In operation, the mandrel 10 will continue to rotate after the power, which operates to rotate the mandrel, has been turned off, by reason of the inertia of the mandrel and of the rotating parts of the driving means provided therefor. In order that the record ejector may be safely operated immediately after the power for the driving means has been shut off, there is commonly provided a mandrel brake which is operated incidental to the act of operating the record ejector. The mandrel brake comprises an arm 47 also pivotally mounted on the shaft 43 and carrying at its upper end a shoe 47', commonly made of felt, which is adapted to contact the adjacent end of the mandrel 10 for retarding, by friction, the rotation of the mandrel. The brake arm 47 is provided with a forwardly extending pin 48 which is resiliently connected to a rearwardly extending pin 49 provided on the record ejecting arm 40 and extending along the right side of the pin 48, as shown in Figs. 1, 3 and 4, the resilient connection being effected by a spring 50 which is coiled about the hub 42 and hooked at its ends about the respective pins 48 and 49. By these means the brake arm 47 is yieldingly moved in a clockwise direction so as to urge the brake shoe 47' against the end of the mandrel as the record-ejecting arm 40 is operated to remove a record from the mandrel.

The above described structure and mechanism are common to record shaving machines heretofore manufactured and used, and form a part of the present invention only in so far as they are related to or combined with other mechanism hereinafter described.

In order that the operator may immediately inspect the record at the end of a tool-record traversal there may be very desirably provided means for automatically stopping the machine when the carriage reaches its terminal position. At the end of such tool-record traversal the operator may desire to do one of three things; namely, to take a second or finishing cut, to take another rough or heavy cut, or to condition the machine for the resurfacing of another record. When a finishing cut is to be made the operator will operate a suitable finishing-cut controlling means provided for advancing the tool towards the record, return the carriage to initial position and restart the machine. When another rough or heavy cut is to be made, the operator will reset the resurfacing tool into operative position with respect to the record, return the carriage to initial position and restart the machine; however when a first rough or heavy cut is to be made on a subsequent record, the resurfaced record will be first removed from the machine and the new record will be mounted thereon, and then a similar set of operations performed. In order that these operations may be conveniently and safely performed without undue care on the part of the operator I provide, according to my invention, various means which are actuated incidental to the act of performing a few fundamental manipulations required in the operation of the phonograph record shaving machine, for locking other manipulative parts against operation and for automatically effecting the operation of still other manipulative parts. All of the means constituting my invention are operated incidental to the procedure of carrying out a normal shaving operation and are adapted to greatly facilitate that operation and to safeguard both the machine and record to be resurfaced from damage through improper operation of the machine. A description of the structural arrangement, features and advantages of my invention is now given in detail.

For controlling the machine I provide a manually operable switch 51 and a normally automatically operated switch 52, the latter being operated by the movement of the carriage, and the former being operatively connected with other parts of the machine for automatically operating and controlling such parts in accordance with its setting. The manual switch 51 and the automatic switch 52 may each be toggle switches of the single-pole one-way type. The manual switch 51 is preferably secured to the underside of the base plate 1 in its front right-end portion, whereas the automatic switch 52 is preferably secured to the top side of the base plate 1 in its rear left-end portion. These switches are serially connected in a power circuit 53 adapted for connecting a motor 54 with a suitable source of power, by way of a plug 55, as schematically represented in Fig. 2. By this arrangement each of the switches 51 and 52 must be in "on" position in order to place the motor 54 in operation; whereas the operation of either switch to "off" position will render the motor inoperative. The motor 54 is preferably secured to the underside of the plate 1 and suitably coupled, as by means of a belt, to a pulley 57 secured to the shaft 8 for providing rotational movement of the mandrel 10 and longitudinal movement (in a left-hand direction) of the carriage 19, the plate 1 having an opening 58 through which the belt may pass.

The switch 51 is manually operable by means of a forwardly extending control lever 59 pivotally mounted on the top side of the base plate 1 in the front right-end portion of the plate. This lever has a shaft 59' extending downwardly through a boss 60 on the underside of the plate 1. Beneath the plate 1 there is a small plate 61 secured to the shaft 59' and having a rearwardly extending arm 62 carrying a slotted and pivoted stud 63 through which slidably passes an operating arm 64 of the switch 51. As the control lever 59 is rocked leftwardly and rightwardly, the arm 62 is rocked rightwardly and leftwardly to operate the switch 51 into "on" and "off" positions, the switch 51, by reason of its toggle nature, snapping into its respective positions. The plate 61 is also suitably connected with other parts of the machine for operating such parts as an incident of operating the switch, as is hereinafter described.

The switch 52 is provided with an operating arm 65 which extends forwardly into the path of the rearwardly and downwardly extending arm 66 on the carriage 19 so that the switch 52 will be moved to "off" position by the terminal movement of the carriage. The switch arm 65 is also suitably extended rearwardly as at 65' so that the switch 52 may, if desired, be easily manually operated. The arm 66 of the carriage is provided with a side extension 66' serving as a support for a pawl 67 which is pivotally mounted thereon by means of a pivot screw 68, as shown in Fig. 5. The pawl 67, which is adapted to coact with the switch arm 65 as next explained, is biased downwardly by means of a tension spring 69, the downward movement of the pawl being limited by the abutment of a lug or stop 70 on the pawl with the end face of the side extension 66'.

On the end portion of the pawl there is a downwardly extending hook having a beveled end face 67'. As the carriage 19 moves forwardly the end face 67' of the pawl is adapted to encounter the switch arm 65 and slide thereover without moving it. As the carriage moves into the end portion of its forward travel the arm 66 will, however, encounter the operating arm 65 of the switch 52 and move it leftwardly to "off" position, shown in dashed lines in Fig. 1, to stop the motor 54 and therefore the movement of the carriage 19 and the rotation of the mandrel 10. As the carriage 19 is returned from its terminal position, the pawl 67 will engage the operating arm 65 so that the arm will be moved rightwardly by the carriage, or leftwardly as it appears in the rear view of Fig. 5. The arm portion of the pawl 67 is suitably elongated so that such engagement will occur when the carriage reaches an intermediate portion of its return travel wherein the resurfacing tool 22 overlies the record. Thus the resurfacing tool may be moved to a position overlying the record without operating the switch 52. In a normal operation of the machine the resurfacing tool may then be set into operative position with respect to the record; afterwards the carriage may be moved through the remaining portion of its return travel, the switch 52 being thereby automatically operated into "on" position.

As the arm 65 of the switch 52 is moved past its dead center position, as in the return movement of the carriage, the arm is adapted to move onwardly to "on" position by reason of the toggle nature of the switch. In the next further return movement of the carriage the pawl 67 is adapted to be moved upwardly so as to clear the operating arm 65. For this purpose the pawl 67 is provided with an arm 72 carrying a laterally extending pin 73 adapted to engage the underside of a cam member 74 secured to the base plate 1 by the screws 75, the cam member 74 being suitably located so that the pin 73 will engage therewith after the operating arm 65 has been moved past its dead center position. In the next further return movement of the carriage, the pawl will be suitably moved to permit the free return of the carriage to its initial position. It will be understood that the pawl 67 will also be moved upwardly by the engagement of the pin 73 with the cam 74, in the forward movement of the carriage, but such movement of the pawl is not objectionable since the pawl is not relied upon to perform any useful function in the forward movement of the carriage.

By the above described means the switch 52 is operated into "on" position as the carriage is returned from its terminal position; however, such operation of the switch 52 will not start the motor 58 unless the switch 51 is also in "on" position. When the carriage is in initial position and the resurfacing tool is properly set, the machine will be put into operation for shaving the record by movement of the switch 51 into "on" position. The resurfacing tool 22 will then traverse the record.

At the end of a tool-record traversal the machine will be stopped, as by the automatic operation of the switch 52 into "off" position. Upon inspecting the record, the operator may decide to take a second or finishing cut, to take another rough cut, or to condition the machine for the resurfacing of another record. In order to insure that when the carriage is returned the machine will be conditioned so that the machine or record may not be subjected to possible damage. I provide means by which the carriage is locked in its terminal position until such proper conditioning of the machine is effected.

The carriage locking means (see Fig. 2a) comprises a vertically disposed latch 77 hinged to the carriage arm 20 about the pivot screw 78 and arranged to coact with a slot 76 provided in the inner side of the left end of the guide rail 15. The latch 77 is suitably biased forwardly, by means of a spring 79, so that it will slidably contact the smooth inner side of the guide rail 15 as the carriage rests thereon and is moved along the record. The latch will then coact with the slot 76 to lock the carriage against tilting and return movement as the carriage moves into the end portion of its forward travel at the completion of a tool-record traversal.

For taking a finishing cut there is provided a suitable finishing-cut controlling means, which when operated is adapted to advance the resurfacing tool 22 a predetermined extent toward the record; this controlling means is connected so that its operation releases the carriage latch 77 to render the carriage free for return movement. The switch 51 will normally be in "on" position as the carriage is returned for the finishing cut; and therefore, when the carriage reaches the initial position, the machine will have been restarted and in condition for the finishing-cut operation. The finishing-cut controlling means comprises a rod 80 mounted for pivotal movement about its longitudinal axis and extending through the shoe 20' of the carriage 19 in substantially parallel relation to the guide rail 15. The rod 80 is adapted to project radially along its length below the lower face of the shoe 20' throughout a minor portion of its periphery. Secured to the rod 80 is a forwardly extending bracket 81 affording easy manual means for turning the rod. When the bracket 81 is in a forward or inoperative position, the arm 20 of the carriage 19 is supported by the guide rail 15 by way of the rod 80. However, as the rod 80 is turned by moving the bracket 81 to an upward or operative position, the arm 20 of the carriage is lowered a predetermined extent, and the tool 22 similarly advanced toward the record axis. Such advancement of the tool is effected by means of a longitudinal flat 82 on the rod 80, which is brought into contact with the guide rail 15 as the bracket 81 is moved into its operative position.

When the finishing-cut controlling means is in operative position, the carriage locking means are maintained in an inoperative position by means of a pin 83 secured to the rod 80. The pin 83 moves the latch 77 into such inoperative position as the rod 80 is turned by upward movement of the bracket 81 into its operative position, the pin coming to rest in an upwardly inclined position relative to the adjacent engaging face of the latch 77. The finishing-cut controlling means is adapted to be held, as by friction, in operative position; the biasing force, urging the latch 77 forwardly, will, however, tend to move the finishing-cut controlling means into inoperative position. During a tool-record traversal such movement is prevented by the contact of the latch 77 with the guide rail 15; however at the completion of a tool-record traversal the slot 76 permits the latch 77 to move forwardly into locking position, thereby automatically restoring the finishing-cut controlling means into inoperative position.

When it is desired, at the end of one tool record traversal, to condition the machine for another rough cut, the resurfacing tool 22 will be released and the carriage will be partially returned to a position wherein the resurfacing tool will overlie the record so that the tool may be reset into operative position. The pawl 67, which coacts with the arm 65 of the switch 52, is suitably elongated so that such partial return of the carriage may be effected without operating the switch 52 into "on" position, the mandrel 10 therefore remaining stopped. It is therefore not essential that the switch 51 be operated into "off" position in order to permit the conditioning of the machine for the heavy cut operation. However, in order to permit the partial return of the carriage, I provide means by which the carriage latch 77 is moved into an inoperative position as an incident of releasing the resurfacing tool from set position.

Reference being had to Figs. 1 and 2, there will be seen the means by which the carriage locking means are rendered inoperative when the resurfacing tool 22 is in inoperative position. These means comprise a link 84 pivotally connected at one end with the cap 31, by the pivot screw 85, and extending lengthwise of the carriage arm 20 into a recess 86 therein by way of a slot 87. In the forward part of the recess 86 there is provided a lever 88 secured to a rod 89 which is pivotally supported by the side walls of the carriage arm 20. The upper arm 88' of the lever 88 is pivotally connected to the forward end of the link 84 by means of a stud 84' secured to that arm and pivoted to the link 84. The other arm 88" of the lever 88 extends forwardly to engage with a suitably shaped arm extension 90 on the latch 77. When the cap 31 is in a downward position the position of the cap when the resurfacing tool is in set or operative position as shown in Fig. 2—the member 88 is free of the arm 90 of the latch 77, thereby rendering the latch operative; on the other hand, as the cap 31 is moved into an upward position for moving the resurfacing tool 22 into inoperative position, the member 88 engages the arm 90 of the carriage latch 77 to move the latch into an inoperative position.

In order that the operator will not be constrained, in the resetting of the resurfacing tool for another heavy cut, to limit the return of the carriage to a position at the left-end portion of the record wherein the switch 52 remains in "off" position (it being understood that with the switch 51 in "on" position, the mandrel rotating means will be restarted if a further return movement of the carriage is effected from such left-end position) I provide means for permitting the resetting of the resurfacing tool at any position along the record. These means are adapted to release the resurfacing tool from set position and to unlock the carriage locking means as an incident of operating the switch 51 into "off" position. Upon properly resetting the resurfacing tool and returning the carriage to initial position, it is only necessary to operate the switch 51 into "on" position in order to restart the machine for another heavy cut.

Reference being had to Figs. 1, 2 and 3 there will be seen means by which the switch 51 is operatively connected with the resurfacing tool for releasing the resurfacing tool 22 from set position, and therefore also rendering the carriage locking means inoperative, as the control lever 59 is operated from "on" to "off" position. The means operatively connecting the switch 51 with the resurfacing tool 22 comprises a link member 91 carrying a pin 92 in its forward end portion which cooperates with a cam slot 93 provided in a rightwardly extending portion of the plate 61. The link member 91 may be of a suitable form such as is shown in Fig. 3, and is pivotally connected at its rear end to an arm 94 of a lever 95 which is pivoted, as by a pivot screw 96, to a boss 97 projecting downwardly from the base plate 1. The other arm 98 of the lever 95 is pivotally connected to a bar 99 by the pivot screw 100. The bar 99 is disposed in parallel relation to the longitudinal rod 18 and extends along the rear edge of the opening 2 slightly within this opening. The bar is supported at its left end by a link 101 pivoted to the base plate 1 by the pivot screw 102 and to the bar 99 by the pivot screw 103, the arm 98 and the link 101 being adapted to form a pair of parallel motion supports for the bar 99 so that it may move forwardly and rearwardly in parallel movement.

On the right side of the carriage 19 there is pivotally supported, as by a relatively long shoulder screw 104, a lever 105 best shown in Fig. 2. The lever 105 is adapted to operatively connect the bar 99 with the actuating lever 36 of the tool setting mechanism. The lever 105 may suitably be of a form having a substantially vertically extending lower portion 106 adapted to slidably contact the front edge of the bar 99; a central substantially semi-circular portion 107 bent at right angles to the portion 106 and pivoted at its upper end on the shoulder screw 104 adjacently of the right side of the carriage 19; a bail portion 108 extending rightwardly underneath the screw 104; and a forwardly extending arm 109 bent at right angles to the bail portion 108 and pivoted on the outer end of the shoulder screw 104. The arm 109 is adapted to contact the underside of the arm 36' of the actuating lever 36 when the lever 36 is in its downmost or operated position. A clockwise movement of the lever 105, such as is effected by the operation of the switch 51 from "on" to "off" position, will then impart a clockwise or upward "tripping" movement to the actuating lever 36 to effect the release of the resurfacing tool 22 from set position.

The cam slot 93 is disposed substantially in an arc about the shaft 59' of the lever 59, and has at its rearward end an inwardly and substantially radially extending notch 111. The pin 92 is adapted to be maintained in the notch 111, as by a tension spring 112 urging the link member 91 leftwardly and forwardly, when the switch 51 is in on position, as shown in Fig. 3. The link member 91 is extended forwardly of the pin 92 and provided with a cam face 91' at the end thereof which is adapted to engage the boss 60 as the control lever 59 is operated to "off" position. In the first portion of the movement of the control lever 59 to "off" position, the pin 92 remains in the notch 111 to effect a rearward movement of the link 91 and a counterclockwise movement of the lever 95, thereby effecting a forward movement of the bar 99. In the forward movement of the bar 99, it contacts the member 105 and turns the member 105 in a clockwise direction to release the resurfacing tool 22 from set position. In the next further movement of the control lever 59 to "off" position the cam face 91' impinges upon the boss 60 to cause the pin 92 to be moved out of the notch 111. The link 91 will then move forwardly, as because of the spring 112, with the pin 92 coming to rest in the forward end portion of the cam slot 93, such forward movement of the link 91 being limited by the engagement of a lug 98' on the arm 98 with the rear edge of the bar 99.

In the movement of the control lever 59 from "off" to "on" position the pin 92 will slide rearwardly in the cam slot 93, and then snap over into the notch 111 by the force of the spring 112 as the control lever 59 reaches the end of its travel. The bar 99 is thus maintained in its most rearward position by the spring 112 during such movement of the control lever 59. Consequently the resurfacing tool 22 may be properly set in operative position while the switch 51 is in "off" position since the operation of the switch 51 from "off" to "on" position will not affect such tool setting. The operation of the switch 51 from "on" to "off" position will, however, effect both the release of the resurfacing tool 22 from set position and the unlocking of the carriage latch 77.

In order that the operator cannot, by inadvertence or mistake, operate the record ejector when the mandrel rotating means are in operation, I provide means whereby the record ejector is locked against operation when the switch 51 is in "on" position. Since the operation of the switch 51 to "off" position is adapted to automatically release the resurfacing tool from set position, this record-ejector lock provides also reasonable assurance against operation of the record ejector when the resurfacing tool is in operative position.

The means for locking the record ejector and mandrel brake comprises an arm 113, on the hub 42 of the ejector operating arm 41, which is adapted to project through an opening 114 in the base plate 1, and into the path of a lug 115 on an arm 116 as the record ejector and mandrel brake are operated. The arm 116 is pivotally mounted, by a shoulder screw 117 on a boss 118 of the base plate 1, and is pivotally connected by a pivot screw 119 to one end of a link 120. The link 120 is connected at its other end by a pivot screw 121 to an arm 122 of the plate 61. When the control lever 59 is in "on" position the lug 115 of the arm 116 is adapted to be directly beneath the arm 113 so that the record ejector and mandrel brake are locked against operation; however, in the operation of the switch 51 from "on" to "off" position the arm 115 is moved out of the path of the arm 113, thereby permitting the operating arm 41 of the record ejector and mandrel brake to be moved rightwardly to an operated position.

In order to facilitate the reconditioning of the machine for another resurfacing operation, as when one record has been resurfaced and ejected from the machine and another record is to be mounted thereon, I provide means whereby the carriage 19 is partially returned from its terminal position to a position wherein the resurfacing tool will overlie the record, as an incident of mounting a record on the machine. The partial return of the carriage 19 is, however, adapted to come within the range of lost motion of the pawl 67 so that the switch 52 is not thereby operated from "off" to "on" position. The mandrel rotating means will therefore remain inoperative and the resurfacing tool will be suitably located so that it may be immediately set into operative position with respect to the newly mounted record. The limitation of the return movement of the carriage is advantageous, as otherwise rotation of the mandrel may be started incidental to the act of mounting a record on the machine—it being understood that such starting could occur if the switch 51 were in "on" position while the resurfacing tool 22 is in inoperative position, so that the carriage locking means is inoperative and the carriage then movable from its terminal position.

Reference being had particularly to Fig. 6 there will be seen means by which such partial carriage return is effected as an incident of closing or moving the end-gate 12 into its supporting position. These means comprise a stud 123 on the shoe portion 20' of the carriage which projects downwardly in front of the guide rail 15. Beneath the stud 123 there is provided a horizontal bar 124 having an upwardly extending hook 124' at its left end. The bar 124 is supported by parallel motion links 125 and 126 which are pivoted to the bar 124 at their upper ends by the respective pivots 127 and 128, and to the guide rail 15 by the respective shoulder screws 129 and 130. The bar 124 is biased leftwardly by a tension spring 131 and is limited in its leftward movement by the contact of the link 126 with a pin 132 provided on the guide rail 15.

The bar 124 is adapted to be operatively connected with the end-gate 12 so that it will be moved rightwardly by the closing movement of the end-gate. The means operatively connecting the bar 124 with the end-gate 12 comprises a bell-crank lever 133 pivoted about the shoulder screw 130 and having an arm 134 with a right-angle end portion 134' normally resiliently held in engagement with the bottom side of a side extension 126' of the link 126, as by a tension spring 135. The lever 133 has an arm 136 extending downwardly through an opening 137 in the base plate 1 and is provided with a right-angle end portion 136' adapted to come into contact with a shoe 138 on the left end of a bar member 139. The bar 139 extends rightwardly and upwardly through an opening 137 in the base plate 1 and then rightwardly substantially in parallel relation to the guide rail 15, and is slidably supported by the left and right shoulder screws 140 and 141 which pass through the respective longitudinal slots 142 and 143 and thread into the guide rail 15. At the right end of the bar 139 there is provided a right-angle end portion 139' which is disposed in the path of the end-gate 12.

It is thus apparent that the bar 139, normally held in its most rightward position by a tension spring 144, is adapted to be moved leftwardly by the contact of the end-gate 12 with its right end portion 139' as the end-gate is closed. As the bar 139 moves leftwardly the shoe 138 contacts the end 136' of the lever 133 and turns it in a clockwise direction. Such movement of the lever 133 effects a rightward movement of the bar 124 about the pivot screws 129 and 130 to move the carriage arm 30 rightwardly, substantially in an arc, thereby partially returning the carriage from its terminal position. The return movement will of course cease when the shoe 20' of the carriage arm 20 comes into contact with the guide rail 15; the bar 139 however, is moved by the end-gate still further leftwardly so that its shoe 138 will ride off of the end 136' of the lever 133. The spring 131 will then tend to return the bar 124 to its initial position but the weight of the carriage arm 20 is sufficient to prevent such return. However, as the carriage is tilted upwardly, as in the operation of moving it through a further portion of its return travel, the bar 124 will be restored to its initial position by means of the spring 131. Such restoration of the bar 124 is permitted by reason of a cutting away of a portion to the right of the shoe 138 on the bar 139 so that the lever 133 may move in a counter-clockwise direction to its inoperative position when the bar 139 is in a leftward operated position.

When the end-gate 12 is next opened the bar 139 will be moved rightwardly by the spring 135. In the end portion of such rightward movement, the shoe 138 will slide past the arm 136 of the lever 133 and impart a slight counter-clockwise movement thereto, such movement being permitted by reason of the resilient coupling between the arm 134 of the lever 133 and the link 126. After the shoe 138 has passed the arm 136, the arm 136 will snap back in front of the shoe by reason of the spring 135. The carriage returning means are then restored for re-operation.

Reference being had to Fig. 7 there will be seen a modification of my invention in which the ejector-locking means is controlled by the operation of the latch 16 for the end-gate 12. In this arrangement the latch 16 is secured to a vertical pin 145 extending through a boss 146 at the right end of the guide rail 15. The latch 16 extends through a suitable recess 147 which is adapted to permit turning movement of the latch between its closed and open positions. At the lower end of the pin 145 there is secured an arm 148 which is pivotally connected to one end of a link 149 by a pivot 150. The link is pivotally connected at its other end by a pivot 151, to an arm 152, pivotally mounted as the aforementioned arm 116 and having a lug 153 which is adapted to be moved into a position to obstruct the operation of the record ejector and mandrel brake. When the latch 16 is closed, as shown in Fig. 7, the lug 153 is directly beneath the arm 113 of the record ejector and mandrel brake so that they are locked against operation. As the latch 16 is operated to open position to permit opening movement of the end-gate 12, the lug 153 is moved out of the path of the arm 113 to permit the operating arm 41 of the record ejector and mandrel brake to be moved rightwardly to operated position.

Although I have shown and described my invention in certain preferred embodiments, it will be understood that many modifications and changes may be made therein without departing from the scope of my invention, which I undertake to express according to the following claims.

I claim:

1. In a phonograph record shaving machine having means for supporting a record, record-rotating means, a carriage, means for advancing the carriage across the record, and a resurfacing tool on said carriage movable to operative position with respect to the record: the combination of a pair of "on" and "off" switches for controlling said record-rotating means and carriage-advancing means; a record ejector rendered inoperable when the first of said switches is in "on" position; means for operating the second of said switches to "off" position by the terminal movement of said carriage; means for locking said carriage against return movement from its terminal position; means for unlocking said carriage-locking means, for rendering said record ejector operable, and for moving said tool out of operative position, as said first switch is operated to off position; means for moving said carriage through a first portion of its return travel incidental to the operation of mounting a record on the machine; and means connected with said carriage for operating said second switch to "on" position by the movement of the carriage through the remaining portion of its return travel.

2. In a phonograph record shaving machine having means for supporting and rotating a record, a carriage, and means for advancing the carriage across the record: the combination of a pair of "on" and "off" switches for controlling the operation of the machine; means for moving said carriage through a portion of its return travel from its terminal position incidental to the operation of mounting a record on the machine; means for operating the first of said switches to "on" position by the movement of said carriage through a remaining portion of said return travel; means for operating the first of said switches to "off" position by the terminal advancing movement of said carriage; means for locking said carriage against return movement from its terminal position; a record ejector rendered inoperable when the second of said switches is in "on" position; and means, operated incidental to the operation of moving said second switch to "off" position, for rendering said ejector operable, unlocking said carriage locking means, and moving said resurfacing tool out of operative position.

3. In a phonograph record shaving machine having a mandrel for supporting a record, an end-gate, mandrel-rotating means, a carriage, carriage-advancing means, and a resurfacing tool movable to an operative position relative to the record: the combination of a pair of "on" and "off" switches for controlling the operation of the machine; a record-ejector rendered inoperable when the first of said switches is in "on" position; means for operating the second of said switches to "off" position by the terminal movement of said carriage; means for locking said carriage against return movement from its terminal position; means for rendering said ejector operable, for unlocking said carriage-locking means, and for moving said tool out of operative position, as said first switch is operated to "off" position; and means operated by movement of said end-gate for moving said carriage through a portion of its return travel from said terminal position as said end-gate is closed.

4. In a phonograph record shaving machine having record-supporting means and record-rotating means: the combination of an "on" and "off" switch for controlling said record-rotating means; a record ejector; and means operated incidental to the operation of moving said switch from "off" to "on" position, for rendering said ejector inoperable.

5. In a phonograph record shaving machine having means for supporting a record and record-rotating means: the combination of an "on" and "off" switch for controlling said record-rotating means; a resurfacing tool movable to operative position with respect to the record; a record ejector rendered inoperable when said switch is in "on" position; and means connected with said switch for rendering said ejector operable and moving said tool out of operative position as said switch is operated from "on" to "off" position.

6. In a phonograph record shaving machine having means for supporting and rotating a record, a carriage, means for advancing the carriage across the record, and an "on" and "off" switch for starting and stopping the operation of the machine: the combination of means for locking said carriage against return movement from its terminal position; a record ejector rendered inoperable when said switch is in "on" position; and means, operated incidental to the operation of moving said switch to "off" position, for rendering said ejector operable and for unlocking said carriage-locking means.

7. In a phonograph record shaving machine having means for rotating a record, a carriage, means for advancing the carriage across the record, and an "on" and "off" switch for controlling said record-rotating means and carriage-advancing means; the combination of means for locking said carriage in the end portion of its travel; a resurfacing tool mounted on said carriage for movement into operative position with respect to the record; and means, operated by the movement of said switch to "off" position, for unlocking said carriage-locking means and effecting the movement of said resurfacing tool out of operative position.

8. In a phonograph record shaving machine having means for supporting and rotating a record, a carriage, means for advancing the carriage across the record, and an "on" and "off" switch for controlling the operation of the machine: the combination of means for locking said carriage against return movement from the end portion of its forward travel; a resurfacing tool mounted on said carriage for movement into operative position with respect to the record; a record ejector rendered inoperable when said switch is in "on" position; and means, operated by the movement of said switch to "off" position, for unlocking said carriage-locking means, for rendering said ejector operable, and for moving said resurfacing tool out of operative position.

9. In a phonograph record shaving machine having means for rotating a record, a carriage, means for advancing the carriage across the record, and a resurfacing tool on said carriage movable into operative position relative to the record: the combination of an "on" and "off" switch for starting and stopping the operation of the machine; means for locking said carriage in the end portion of its forward travel; means connected with said resurfacing tool, for unlocking said carriage-locking means as said tool is moved to inoperative position; and means, connected with said switch, for unlocking said carriage-locking means and moving said resurfacing tool out of operative position as said switch is operated from "on" to "off" position.

10. In a phonograph record shaving machine having means for rotating a record and a carriage movable along the record: the combination of a resurfacing tool mounted on said carriage for movement into operative and inoperative positions relative to the record; means for locking said carriage in the end portion of its forward travel; and means, connected with said resurfacing tool, for rendering said carriage-locking means inoperative when said resurfacing tool is in inoperative position.

11. In a phonograph record shaving machine having means for rotating a record and a carriage movable along the record: the combination of a resurfacing tool on said carriage movable to operative position with respect to the record; finishing-cut controlling means operable to advance said resurfacing tool towards said record; means for locking said carriage in the end portion of its forward travel; and means, controlled by said finishing-cut controlling means, for rendering the carriage-locking means inoperative when said finishing-cut controlling means are in operative position.

12. In a phonograph record shaving machine having means for supporting a record, a carriage movable across the record, and an "on" and "off" switch for controlling the operation of the machine: the combination of a resurfacing tool on said carriage movable into operative position relative to the record; means for locking said carriage in the end portion of its forward travel; means for unlocking said carriage-locking means as said resurfacing tool is moved out of operative position; and means, connected with said switch, for unlocking said carriage and moving said resurfacing tool out of operative position as said switch is operated to "off" position.

13. In a phonograph record shaving machine having means for rotating a record, a carriage movable along the record, and carriage-advancing means: the combination of a resurfacing tool mounted on the carriage for movement to operative position with respect to the record; separately operable finishing-cut controlling means for advancing said resurfacing tool towards said record; and means, operated by the terminal-advancing movement of the carriage, for restoring said finishing-cut controlling means to inoperative position.

14. In a phonograph record shaving machine having means for rotating a record, a carriage movable along the record and carriage-advancing means: the combination of a resurfacing tool movably mounted on said carriage for movement to an operative position with respect to the record; finishing-cut controlling means operable to advance said tool towards said record; means for maintaining said finishing-cut controlling means in operative position during a traversal of said tool with respect to the record; and means, automatically operated as an incident of the terminal movement of said carriage, for restoring said finishing-cut controlling means to inoperative position.

15. In a phonograph record shaving machine having means for rotating a record, a carriage movable along the record, and carriage-advancing means: the combination of a resurfacing tool mounted on said carriage for movement to an operative position with respect to the record; finishing-cut controlling means operable to advance said tool towards said record; means operable to restrict return movement of said carriage from its terminal position; and means, automatically operated by the terminal movement of said carriage, for rendering said restricting means operative and restoring said finishing-cut controlling means to inoperative position.

16. In a phonograph record shaving machine having means for rotating a record, and a carriage movable along the record: the combination of a resurfacing tool on said carriage movable to operative position relative to the record; finishing-cut controlling means operable to advance said tool towards said record; means for restricting manual movement of said carriage; and means, controlled by said finishing-cut controlling means, for rendering said restricting means inoperative when said finishing-cut controlling means is in operative position.

17. In a phonograph record shaving machine having means for rotating a record, a carriage, and means for advancing the carriage across the record: the combination of an "on" and "off" switch for controlling said record-rotating means and carriage-advancing means; means for operating said switch to "off" position as said carriage is moved through the end portion of its forward travel; and means, rendered operative as said carriage is moved through said end portion of its forward travel, for releasably locking said carriage in its terminal position.

18. In a phonograph record shaving machine having means for supporting a record and a resurfacing tool movable across the record for resurfacing the same: the combination of means for advancing said resurfacing tool across the record; and means, operated as an incident of mounting a record on the machine, for imparting return movement to said resurfacing tool.

19. In a phonograph record shaving machine having a rotatable mandrel for supporting a record: in combination, a support for said mandrel movable between supporting and non-supporting positions; a carriage; means for advancing said carriage across the record; and means, responsive to movement of said support, for imparting return movement to said carriage as an incident of moving said support from non-supporting to supporting positions.

20. In a phonograph record shaving machine having means for supporting a record, a carriage, means for advancing the carriage across the record, and an "on" and "off" switch for starting and stopping the operation of the machine: the combination of means for moving said switch to "off" position by the terminal movement of said carriage; means, operated as an incident of mounting a record on the machine, for moving said carriage through a first portion of its return travel; and means, responsive to movement of said carriage, for operating said switch to "on" position as said carriage is moved through a further portion of its return travel.

21. In a phonograph record shaving machine having means for supporting a record, a carriage, means for advancing the carriage across the record, and an "on" and "off" switch for starting and stopping the operation of the machine: the combination of a resurfacing tool on said carriage; means for moving said switch to "off" position by the terminal movement of said carriage; means, operated incidental to the operation of mounting a record on the machine, for returning said carriage from its terminal position to a position wherein said resurfacing tool overlies the mounted record; and means, operated incidental to the operation of moving said carriage through a further portion of its return travel, for operating said switch to "on" position.

22. In a phonograph record shaving machine having a mandrel for supporting a record, mandrel-rotating means, a carriage, means for advancing the carriage across the record, and an "on" and "off" switch for starting and stopping the operation of the machine: the combination of means for moving said switch to "off" position by the movement of said carriage through the end portion of its forward travel; an end-gate; means for moving said carriage through a first portion of its return travel as said end-gate is closed; and means, connected with said carriage, for operating said switch to "on" position as said carriage is moved through a further portion of its return travel.

23. In a phonograph record shaving machine having a mandrel for supporting a record, an end-gate for said mandrel, and a pivotally mounted carriage movable along the record: the combination of means for moving said carriage through a portion of its return travel along the record incidental to the operation of closing said end-gate; and means, automatically operated as an incident of opening said end-gate and pivotally moving said carriage, for restoring said carriage-returning means to an unoperated position.

24. The combination claimed in claim 2, further including finishing-cut controlling means for advancing said resurfacing tool towards said record; and means, connected with said finishing-cut controlling means, for maintaining said carriage-locking means in inoperative position when said finishing-cut controlling means is operated.

25. In a phonograph record shaving machine having an "on" and "off" switch for controlling its operation, a record support and a carriage movable relative to said support: the combination of means for locking said carriage in the end portion of its forward travel; a resurfacing tool on said carriage movable to operative position with respect to a supported record; finishing-cut controlling means for advancing said tool a predetermined distance towards said record; means for rendering said carriage-locking means operative and inoperative as said finishing-cut controlling means is respectively rendered inoperative and operative; and means, operated by the movement of said switch from "on" to "off" position, for rendering said carriage-locking means inoperative when said finishing-cut controlling means is inoperative.

26. In a phonograph record shaving machine having a mandrel for supporting a record, an end-gate for said mandrel, and a latch for said end-gate: the combination of a record ejector; means for locking said ejector against operation; and means, connecting said latch with said ejector-locking means, for rendering said locking means operative as said latch is moved into operative position.

27. In a phonograph record shaving machine having record-supporting means and means for rotating said record-supporting means: the combination of an "on" and "off" switch for controlling said rotating means; a record ejector; a brake for said record-supporting means; and means, connected with said switch, for rendering said record ejector and brake inoperable when said switch is in "on" position.

28. In a phonograph record shaving machine having record-supporting mandrel and mandrel rotating means: the combination of an "on" and "off" switch for controlling said mandrel rotating means; a resurfacing tool movable to operative position with respect to the record; a record ejector; a mandrel brake; means for rendering said record ejector and mandrel brake inoperable when said switch is in "on" position; and means, connected with said switch, for rendering said record ejector and mandrel brake operable and for moving said tool out of operative position as said switch is operated from "on" to "off" position.

29. In a phonograph record shaving machine having record-rotating means, a carriage, and carriage-advancing means: the combination of a pair of "on" and "off" switches; a control circuit having said switches serially connected therein for controlling said record-rotating means and carriage-advancing means; means, controlled by said carriage, for operating one of said switches to "off" and "on" positions by the respective forward and return movements of said carriage; and means for manually operating said several switches respectively.

30. In a phonograph record shaving machine having means for rotating a record, a carriage, and means for advancing the carriage across the record: the combination of a resurfacing tool on said carriage movable into operative position relative to the record; control means for said record-rotating means and carriage-advancing means; means, connected with said carriage, for operating said control means to stop the machine by the terminal movement of the carriage and to restart the machine by the return of the carriage to initial position; and a manual control, connected with said control means, for simultaneously moving said resurfacing tool out of operative position and conditioning said control means to maintain said record-rotating and carriage-advancing means in inoperative condition as said carriage is returned to initial position.

31. In a phonograph record shaving machine having means for supporting a record: the combination of a support for said record-supporting means, movable into supporting and non-supporting positions; a record ejector; and means rendered operative while said support is retained in a supporting position for rendering said record ejector inoperative.

32. In a phonograph record shaving machine having a record support: the combination of a tool-carriage adapted to be forwardly driven and otherwise manually moved relative to said support; means operable to lock said tool-carriage against manual return from the end portion of its forward travel; and means, operated incidental to a driving movement of said tool-carriage into said end portion of its travel, for rendering said locking means operative.

33. In a phonograph record shaving machine having rotatable record-supporting means and means for rotating said record-supporting means: the combination of an "on" and "off" switch for controlling said rotating means; a brake for said record-supporting means; and means, controlled by said switch, for rendering said brake inoperable when said switch is in "on" position.

CHARLES HUENLICH.